US010311460B2

(12) United States Patent
Jenson

(10) Patent No.: US 10,311,460 B2
(45) Date of Patent: Jun. 4, 2019

(54) METHOD AND PROGRAM PRODUCT FOR LOYALTY REWARDS PROGRAMS

(71) Applicant: Peter Jenson, Florence, OR (US)

(72) Inventor: Peter Jenson, Florence, OR (US)

(*) Notice: Subject to any disclaimer, the term of this patent is extended or adjusted under 35 U.S.C. 154(b) by 352 days.

(21) Appl. No.: 15/096,780

(22) Filed: Apr. 12, 2016

(65) Prior Publication Data

US 2017/0293928 A1 Oct. 12, 2017

(51) Int. Cl.
*G06Q 30/02* (2012.01)
(52) U.S. Cl.
CPC ................. *G06Q 30/0226* (2013.01)
(58) Field of Classification Search
None
See application file for complete search history.

(56) References Cited

U.S. PATENT DOCUMENTS

| | | | | |
|---|---|---|---|---|
| 9,356,790 | B2* | 5/2016 | Zambetti | H04L 12/1813 |
| 2010/0280898 | A1* | 11/2010 | Kasuya | G06Q 30/02 |
| | | | | 705/14.33 |
| 2011/0071893 | A1* | 3/2011 | Malhotra | G06Q 10/109 |
| | | | | 705/14.23 |
| 2011/0112881 | A1* | 5/2011 | Malhotra | G06Q 10/10 |
| | | | | 705/7.21 |
| 2011/0137716 | A1* | 6/2011 | Reuthe | G06Q 20/04 |
| | | | | 705/14.17 |
| 2012/0054000 | A1* | 3/2012 | Boppert | G06Q 30/02 |
| | | | | 705/14.1 |
| 2012/0143952 | A1* | 6/2012 | von Graf | G06Q 10/10 |
| | | | | 709/204 |
| 2012/0197708 | A1 | 8/2012 | Mullen et al. | |
| 2013/0030887 | A1* | 1/2013 | Calman | G06Q 30/0207 |
| | | | | 705/14.14 |
| 2014/0278850 | A1* | 9/2014 | Boccuzzi, Jr. | G06Q 30/0208 |
| | | | | 705/14.11 |
| 2014/0310080 | A1 | 10/2014 | Salmon et al. | |

* cited by examiner

*Primary Examiner* — Sunit Pandya

(57) ABSTRACT

A method and program product includes accessing a customer account on a server system. A revolving list of tasks associated with the customer account is received. The revolving list of tasks at least includes a plurality of businesses and at least one action to be completed for each business. The plurality of businesses are selected by the server system from a group of associated businesses using a selection algorithm. The selection algorithm at least in part uses a random selection. A completion of a one of the tasks is communicated, wherein the server system removes the task from the list creating an empty slot, and assigns a reward to the customer account.

20 Claims, 12 Drawing Sheets

METHOD AND PROGRAM PRODUCT FOR LOYALTY REWARDS PROGRAMS

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to loyalty rewards programs. More particularly, the invention relates to loyalty rewards programs with consistent cash value across businesses.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. One invention shows a system and method to provide a universal loyalty currency, facilitate exchange of loyalty benefits, and allow payments using loyalty benefits. In this invention, a group of businesses may give points to customers through a credit, debit, or pre-paid financial arrangement employing a transaction processing system. Using a specialized or non-specialized card at a participating merchant in the group, a customer earns points that can be used at any merchant within the group. A merchant may specify different exchange rates of loyalty benefits and price discounts for products and/or services provided by the respective merchants.

By way of educational background, another aspect of the prior art generally useful to be aware of is that a system allows customers to make purchases and earn rewards from a plurality of participant merchants using multiple payment forms, and at the same time, allows customers to redeem rewards at both participant and non-participant merchants. The system may be implemented in both physical retail environments and online shopping environments.

By way of educational background, another aspect of the prior art generally useful to be aware of is that some companies offer digitally-based loyalty rewards programs that allow customers to visit participating businesses and earn rewards for making purchases. The rewards that customers earn from these programs may only be redeemed at the businesses they were earned at.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
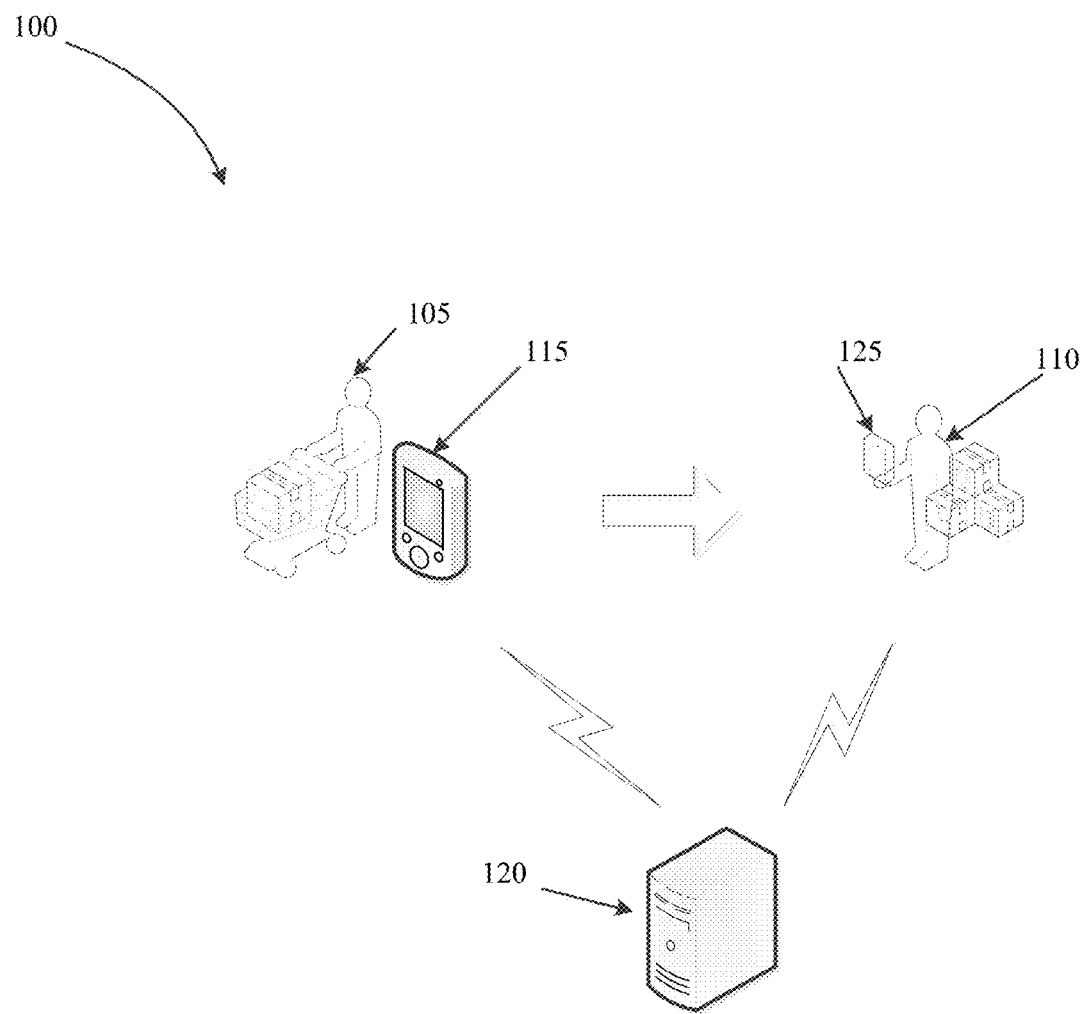
FIG. 1 illustrates an exemplary system, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re *Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.,* 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys. Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.,* 279 F.3d 1022 (Fed. Cir. 2002) (construing the terms "substantially constant" and "substantially below"); *Zodiac Pool Care, Inc.* v. *Hoffinger Indus., Inc.,* 206 F.3d 1408 (Fed. Cir. 2000) (construing the term "substantially inward"); *York Prods., Inc.* v. *Cent. Tractor Farm & Family Ctr.,* 99 F.3d 1568 (Fed. Cir. 1996) (construing the term "substantially the entire height thereof"); *Tex. Instruments Inc.* v. *Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.,* 66 F.3d 1211, 1217, 36 USPQ2d 1225, 1229 (Fed. Cir. 1995); see, e.g., *Andrew Corp.* v. *Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Many embodiments, and variation thereof, provide for means and steps for a digitally-based marketing and customer incentive platform that allows customers to earn rewards by completing tasks and making purchases at participating business. In some embodiments, using a website or a mobile app, consumers may sign up for customer accounts and business owners or managers may sign up for business accounts. In some embodiments, among the rewards that those with customer accounts may be able to earn are rewards points which may be spendable, at consistent cash-value, at any participating business in the network. Points may be earned whenever an individual with a customer account makes an eligible purchase at a participating business with an active business account. In some embodiments, the number of points earned in a given transaction may be influenced by the value of the transaction. In some embodiments, the platform may also have a novel feature called the "Hot List" that may direct customers to specific businesses in the rewards network by offering additional and exclusive rewards including, but not limited to, increased discounts at businesses on the Hot List and digital "Tokens" that may be used in future transactions to increase the number of points earned for a single transaction. In some embodiments, the additional and exclusive rewards associated with completing a Hot List task may be beneficial to the consumer independently of whether or not the completion of the task itself was an enjoyable or beneficial experience for the consumer in and of itself. As a non-limiting example, a customer may still benefit from having completed a Hot List task even if the completion of the task resulted in them buying lunch at a restaurant that they ended up not enjoying. In some embodiments, completion of a Hot List task may be viewed as a "payment" that the user made in order to obtain the associated rewards. In some embodiments, the Hot List may also use additional rewards to incentivize customers to perform specific tasks that may not require purchases at network businesses including, but not limited to, "checking in" via GPS at a particular location, signing up for a website, or posting a comment on a forum. In some embodiments, customers may have the ability to remove businesses from the Hot List either by accomplishing the primary task or through alternative means. In a non-limiting example, the customer may visit a business on the Hot List and make a $5 minimum purchase to complete the task. In another non-limiting example, the customer may purchase a "credit" at businesses on the Hot List, expend a Token, or wait a set period of time.

In many embodiments, and variations thereof, customers may create an account on the app or website. In some embodiments, customers may make payments to a business through the app and receive points that are spendable in lieu of cash at participating businesses in the network. In some embodiments, customers may use the app to confirm transactions that were made through a business's own point-of-sale terminal. In a non-limiting example, the customer paid with physical cash and did not did not transfer funds using the system's own payment processing system.

In many embodiments, and variations thereof, businesses may create an account on the website. In some embodiments, users with multiple business locations or even multiple businesses may be able to use a single master account to manage all of them. In some embodiments, businesses enter in information about their business, such as, but not limited to, name, location, and category of business. In some embodiments, businesses may enter in bank account information to facilitate the transfer of funds from customers using system's payment processing system to purchase their offered goods and services. In some embodiments, businesses may enter in various forms of payment information to facilitate the process of the system billing them for transactions that were confirmed in the app, but not paid through the system app, such as, without limitation, cash.

FIG. 1 illustrates an exemplary system, in accordance with an embodiment of the present invention. System 100 may include a plurality of customers, a sampling of which is denoted by customer 105, a plurality of businesses, a sampling of which is denoted as business 110, and a server 120. System 100 provides a digital rewards program through which customers 105 may earn points by making purchases at participating businesses 110. Points may be earned by customers 105 after purchases and can be redeemed at any participating business 110 in the network in place of cash. The number of points earned for a given transaction may be affected by the purchase price. System 100 includes, but not limited to, an electronic app based rewards system allows for a rewards system that is not reliant on physical rewards cards and allows customers to use their mobile computing device 115 such as, but not limited to, smartphone, tablet, etc. to make purchases through the app or record/confirm that payments occurred while earning points for those purchases. In the present embodiment, customers 105 may earn rewards at one business and spend them at any other business in the network. Customers 105 may have an option of inputting payment information such as, but not limited to, credit/debit cards, bank account, etc. into their account so that they may pay at participating businesses 110 using system 100 payment processing system. Customer 105 may use the app on mobile computing device 115 to identify stores in the network and may utilize various methods such as, but not limited to, name search, store ID search, GPS location, etc. of identifying and locating stores at which to make purchases. Customers 105 may be able to browse individual profiles for each business listed to learn information about that business such as, but not limited to, name, category, pictures, description, menu, contact information, hours of operation, etc. Customers 105 may make payments at businesses 110 through the app using the payment method of their choice such as, but not limited to, credit card, bank transfer, points, credit, etc. In some embodiments, customer 105 may use a point of sale (POS) terminal 125 at business 110 to make a purchase and use the app on mobile computing device 115 to record the transaction on server 120. In the present embodiment, customers 105 may earn points by making purchases at participating businesses 110, with the exception of transactions that are entirely paid for using points. As a non-limiting example, customer 105 may receive points if they make a transaction with a credit card, but not if the total value of the transaction is paid for using points that they previously earned. In some embodiments, customer 105 may receive points for a portion of the transaction that exceeds a value of points used. In the present embodiment, business 110 may be able to access electronic records on server 120 of their transactions that have occurred through system 100. In an alternate embodiment, POS terminal 125 or another networked terminal may have real time access to server 120 where a clerk at business 110 may approve a current transaction of customer 105. Businesses 110 may be able to receive their payments through the app in the form of, but not limited to, bank transfers to their business accounts or physical checks.

Figure 2:
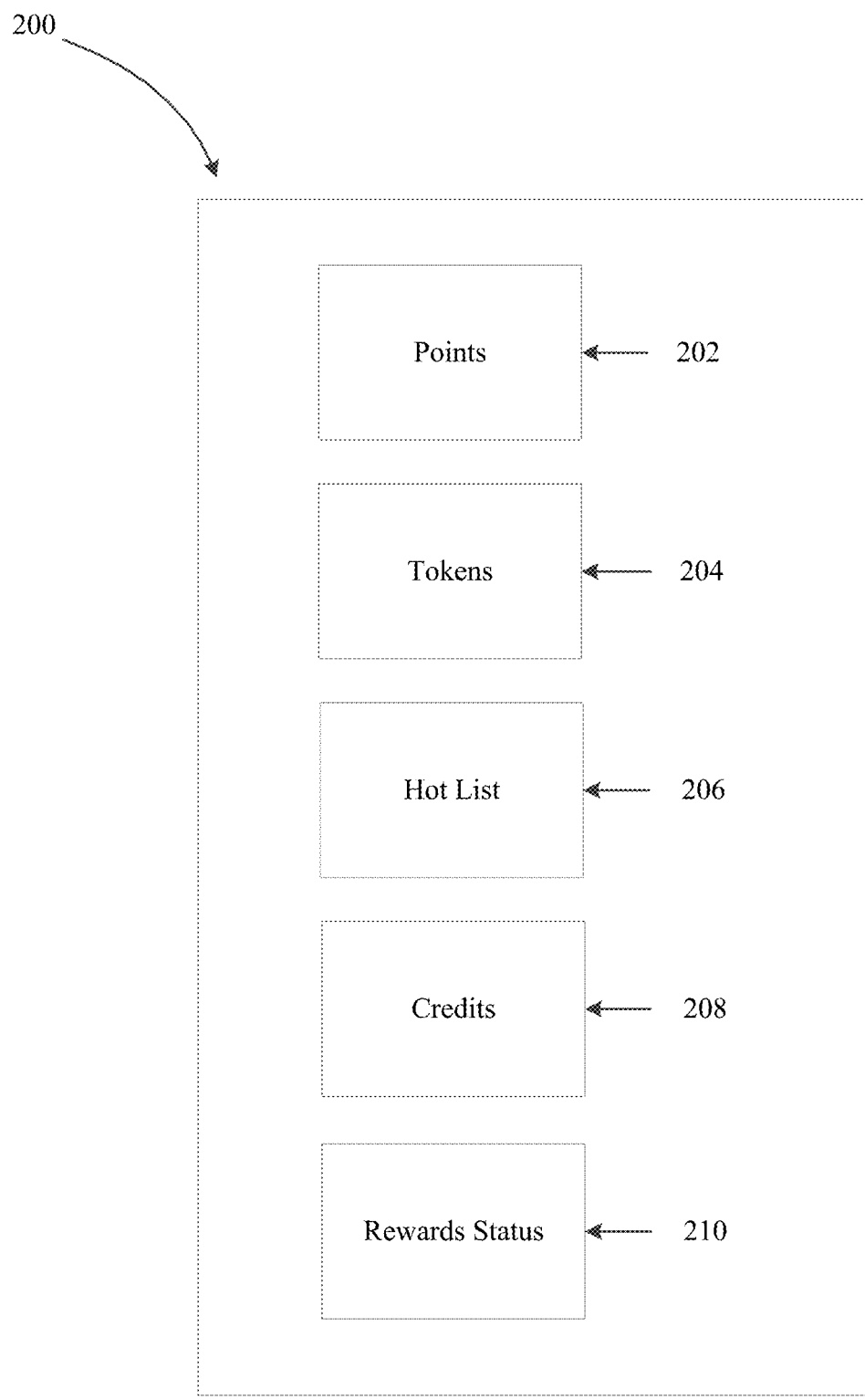
FIG. 2 illustrates an exemplary customer account, in accordance with an embodiment of the present invention.

FIG. 2 illustrates an exemplary customer account, in accordance with an embodiment of the present invention. Customer account 200, may include, but not limited to, points 202 rewarded for transactions, tokens 204 rewarded for completing a task on a Hot List 206, Hot List 206, Credit 208, and Rewards Status 210. In the present embodiment, Points 202 may be spendable in lieu of cash and at cash-value at any business 110 in the System 100. In the present embodiment, Credit 208 may be spendable in lieu of cash and at cash-value but only at a specific business 110 in the System 100, but a customer account 200 may hold Credit 208 at multiple businesses. In a non-limiting example, a customer account 200 may hold $15.00 in Credit 208 at one business 110, and $10.00 in Credit 208 at a separate business 110. In the present embodiment, customer account 200 may have an associated Rewards Status 210 that may determine the quantity and/or quality of rewards that customer account 200 may be able to earn. In the present embodiment, the Rewards Status 210 associated with customer account 200 may be able to be changed based on activity associated with customer account 200, such as, without limitation, the completion of tasks on Hot List 206. In a non-limiting example, completing two out of ten tasks on Hot List 206 may result in customer account's 200 Rewards Status 210 changing from "Bronze" to "Silver", which then allows customer account 200 to receive the quantity and/or quality of rewards associated with the "Silver" Rewards Status 210.

In the present embodiment, Hot List 206 may provide customers with a revolving list of tasks to complete, such as, without limitation, randomly selected businesses to make minimum purchases at, in order to gain additional and exclusive rewards that benefit the user independently of whether or not the completion of the task itself was an enjoyable or beneficial experience for the user in and of itself. A task that involves making a minimum purchase at a specific business will hereafter be referred to as a "Purchase Task". In some embodiments, tasks on the Hot List 206 may be determined by administrators of the System 100 in collaboration with businesses that participate in the System 100. In a non-limiting example, tasks may be designed to increase the diversity of a customer's spending habits by giving them specific incentives to visit new businesses they have never visited before. Administrators of the System 100 may also communicate with individual businesses that participate in the System 100 to create certain tasks of their choosing, such as trying a particular item on their menu. Thus, completion of a Hot List 206 task may be viewed as a "payment" that the user made in order to obtain the associated rewards.

Some potential rewards for completing Hot List 206 tasks such as, without limitation, Purchase Tasks may include receiving a higher rewards rate or enhanced Rewards Status 210 for the transaction and/or gaining tokens 204 that may be spent at any business in the network thereafter to achieve a higher rewards rate or enhanced Rewards Status 210 for a single transaction or redeemed in some other fashion to receive some other benefit. In some embodiments, Points 202 may only be earned by a customer 105 by completing Purchase Tasks on their Hot List 206. In some embodiments, Points 202 may be earned by a customer 105 by making purchases at any business 110 participating in the System 100, but a customer earns more Points 202 per unit of money spent for completing Purchase Tasks Hot List 206. In general, completion of Hot List tasks may result in a customer 105 earning rewards that are exclusive in terms of type, quantity, and/or quality, such that the rewards associated with the Hot List 206 are nonequivalent to the rewards that a customer might be able to earn by making purchases at businesses 110 that are not currently on their Hot List 206.

In some embodiments, customers may have a pool of "Bonus Points" that they can earn by using the System 100 to make purchases at any participating business and/or by completing tasks on the Hot List 206. In such an embodiment, Bonus Points may not be accessible by a consumer unless they complete a certain number of tasks on the Hot List 206, at which point the customer might then be awarded by having their Bonus Points converted to Points 202 which the customer can use or spend at any time. In such an embodiment, Bonus Points may be earned in addition to regular Points 202, but differentiated based on their characteristic of being unavailable for use by the customer unless or until they complete a certain number of tasks on their Hot List 206. In such an embodiment, Bonus Points may be rendered permanently unavailable for potential use or viewing if the customer does not complete a certain number of tasks on the Hot List 206 in a certain period of time. In a non-limiting example, a customer may, for every transaction using the System 100 at a participating business, have a rate at which they earn Points 202 and a separate rate at which they earn Bonus Points. Although the customer may be able to spend their Points 202 as soon as they earn them, their Bonus Points may be unavailable for usage unless they complete a certain number of tasks, for example 10 tasks, on their Hot List 206 for the current month. If the customer does not complete the given number of tasks (for example 10) on their Hot List 206 for the current month, then, at the beginning of the next month, all earned Bonus Points may disappear from their account and their balance of Bonus Points resets to zero. If the customer does complete all the tasks on their Hot List 206 for the current month, for example ten tasks, then all of their earned Bonus Points may immediately be "unlocked" and converted to non-volatile Points 206 that the customer can spend at any time.

In some embodiments, customers may use tokens 204 to remove tasks on their Hot List 206. In some embodiments, at the end of a time period such as, without limitation, each month, empty slots on the Hot List, such as those created by tasks that were completed, may be replaced with new tasks. The customer may have an incentive to use tokens to remove a task on their Hot List 206 for the purpose of refilling that empty slot with a new task next time period. In some embodiments, removing all tasks on the Hot List 206 may have the effect of automatically repopulating the Hot List 206 with more tasks. In a non-limiting example, if a customer has completed 8 out of 10 tasks on their list, they may use 2 tokens to remove the last 2 tasks and then receive 10 new tasks on their list.

In some embodiments, customers may receive an increased rewards rate or enhanced Rewards Status 210 for the next time period based on the number of Hot List 206 tasks that have been completed. In a non-limiting example, 0.5% for each completed task up to a max of 5% bonus for their rewards rate in addition to tokens 204, wherein the bonus rewards rate is maintained for an entire month. In another non-limiting example, there may be 5 different rewards tiers with a hierarchy based on an increasing quality and/or quantity of rewards, and the completion of two Hot List 206 tasks may result in the achievement of the next-level rewards tier for the next time period.

In some embodiments, tokens 204 may not be used to remove tasks from the Hot List 206. However, at the end of each month, all tasks on the Hot List 206 may be replaced with new tasks. In a non-limiting example, if a customer completed 2 out of 10 tasks on their Hot List 206 for the current time period, there would be 8 remaining tasks on their Hot List 206 and two empty slots. However, at the beginning of the next time period, those 8 remaining tasks as well as the two empty slots may be replaced with newly selected tasks. In this embodiment it may remove the potential issue of customers' Hot Lists 206 becoming full of old tasks they do not want to complete since those tasks involve businesses they may not want to visit, which may prevent new businesses that joined the network from appearing on a customer's Hot List 206. Additionally, this embodiment may preserve the same incentives as other embodiments such as, but not limited to, an inherent sacrifice associated with not completing a Hot List 206 task since the customer foregoes the increased rewards rate or enhanced Rewards Status 210 for the next time period that they may have had by completing the task.

In some embodiments, Hot List 206 tasks may not be limited to making purchases at businesses with physical locations. Tasks involving web-based businesses may be on a Hot List 206 and customers may have an action they must complete such as, without limitation, signing up for business X's services at their website to remove the task from their Hot List 206 and receive the associated rewards. In some embodiments, Hot List 206 may not be just a method for directing customer traffic to brick and mortar businesses by requiring them to visit and make a purchase at a location. It may also be used to direct customer activity and incentivize behavior by providing customers with rewards for their actions such as, without limitation, signing up for a service or visiting a website.

In some embodiments, tasks that show up on a customer's Hot List 206 may be based on their geographical location. In a non-limiting example, if customers move to a new location Hot List 206 may be refreshed and offer them new tasks involving new businesses in the new area they are located at. If the customer returns to the previous area, Hot List 206 may revert back to their old list for that region. In some embodiments, tasks that may be selected for inclusion on Hot List 206 may be a result of selection algorithms that are influenced by criteria such as, but not limited to, random selection, customer spending habits, customer interests as determined by survey/questionnaire data, and purchased advertising space. In some embodiments, the selection algorithm may be purely random, selecting businesses for inclusion on any given customer's Hot List 206 based on completely random selection of businesses located within set limits of the customer's geographic area. In some embodiments, the selection algorithm may take into account data such as the customer's spending habits. In a non-limiting example, if the customer's purchase history indicates a very high proportion of purchases being made at businesses that fall into the "Clothing" category, the selection algorithm might give preference to selecting businesses for inclusion on that customer's Hot List 206 that fall into the "Clothing" category. In another non-limiting example, the opposite might even be true, where, for this customer, the selection algorithm might have a bias against businesses in the "Clothing" category so that the Hot List 206 functions to incentivize the customer to diversify their spending habits by spending at different categories of stores. In some embodiments, a business may be able to purchase featured advertising which may involve preferential selection for inclusion on customers' Hot Lists, such as, without limitation, a doubled or tripled chance of being selected on any given customer's Hot List for some period of time.

In the present embodiment, when a customer has a Purchase Task on their Hot List 206, they have the alternative option of purchasing credit 208 at the associated business in order to receive at least some of the rewards associated with completion of that Purchase Task on their Hot List 206 without actually having to make a Store Purchase. A "Store Purchase" occurs when a customer uses the Erndo system 100 to carry out or record a purchase for any goods or services other than Erndo credit 208 from an Erndo-associated business. In some embodiments, credit 208 may be purchased and redeemed at cash-value. In a non-limiting example, a customer may purchase $10.00 in credit 208 at a business and thereafter redeem that credit 208 for $10.00 in goods and services at that business. After credit 208 has been purchased, credit 208 may then remain active at the business it was purchased at, and the customer may visit that business at a later time and have the credit applied to the transaction.

In some embodiments, customers may not receive all of the rewards associated with completion of a Hot List 206 Purchase Task by purchasing Credit 208 in lieu of making a Store Purchase until they actually visit the business to spend the credit in order to purchase an actual good or service from the business. In such an embodiment, customers may be able to receive some of the rewards associated with completing a Hot List 206 Purchase Task by purchasing Credit 208, but they simply may not receive all of the Hot List 206 rewards for that Purchase Task until they visit the business to make an actual purchase. In a non-limiting example, a customer may purchase Credit 208 at a business associated with a Purchase Task on their Hot List 206 in order to increase their rewards rate or enhance their Rewards Status 210 for the next time period, but they may not receive Tokens 204 or Points 202 until they actually visit the business to make a purchase. In another non-limiting example, a customer may purchase credit at a business associated with a Purchase Task on their Hot List 206 in order to receive Tokens 204 and Points 202, but they may not receive an increased rewards rate or enhanced Rewards Status 210 for the next time period until they make an actual Store Purchase at that business.

In some embodiments, customers will receive all of the rewards associated with completion of a Hot List 206 Purchase Task by purchasing Credit 208 in lieu of making a purchase at the business associated with the Purchase Task. In a non-limiting example, a customer may purchase Credit 208 at a business associated with a Purchase Task on their Hot List 206 in order to receive the exact same rewards they would have received if they would have made an actual purchase at that business in order to complete the Purchase Task. In some embodiments, there is a minimum purchase associated with the purchasing of Credit 208. In a non-limiting example, a customer is required to purchase at least $10.00 in Credit 208 at a business associated with a Purchase Task on their Hot List 206 in order to remove the task from their Hot List 206 and receive the rewards associated with completion of a Hot List 206 task.

In some embodiments, the minimum purchase for Credit 208 associated with a Purchase Task may be greater than the minimum Store Purchase associated with that Purchase Task. This may serve to disincentivize a customer from purchasing Credit 208 in lieu of making an actual Store Purchase when presented with a Purchase Task, while still giving the customer an alternative means of receiving the rewards associated with the Purchase Task. In a non-limiting example, a customer may receive a Purchase Task on their Hot List 206 involving an auto body shop that offers oil changes, and the minimum Store Purchase to complete the Purchase Task might be $5.00. The customer may not currently need an oil change or anything else offered by this auto body shop, but the customer might still want to receive the rewards associated with this Purchase Task. Even though the minimum purchase of Credit 208 for this purchase task might be $10.00 instead of the $5.00 minimum for the Store Purchase, the customer might elect to purchase $10.00 in Credit 208 for the auto body shop in order to receive the rewards associated with this Purchase Task while also intending to redeem the credit at a later date when the customer may actually be in need of an oil change. In some embodiments, Credit 206 may be "refunded" by being converted to Points 202 if the business for which the Credit 206 is active either leaves the Erndo network or goes out of business.

In some embodiments, there may be a notable difference between removing a task on the Hot List 206 and completing it. In some embodiments, a customer completing a task on their Hot List 206 may automatically result in the removal of that task from the Hot List 206, making it so that the customer must complete other tasks on their Hot List 206 in order to continue receiving rewards associated with the completion of Hot List 206 tasks. In some embodiments, customers may have the ability to remove tasks from the Hot List 206 without completing the task, although doing so may not result in any of the rewards associated with completion of a Hot List 206 task, but a customer might still wish to remove a task from their Hot List 206 for the sake of having it replaced with a new task that the customer might find more desirable. In some embodiments, a customer may be able to expend Tokens 204 in order to remove a task from their Hot List 206 without completing the task so that it may be replaced with another task. In a non-limiting example, a customer may receive a task on their Hot List 206 that involves making a purchase at a business that the customer has a strong religious objection to, but they may have the option of expending Tokens 204 to remove the task such that it will be replaced with another task at the next eligible event, such as, without limitation, the 1$^{st}$ of the next month. In other embodiments, all Hot List 206 tasks and empty slots may be replaced automatically on a regularly scheduled interval, and customers may not capable of removing tasks from their Hot List 206 without either completing the task or, in the case of Purchase Tasks, opting for the alternative that is the purchasing of Credit 208 at the business associated with the Purchase Task.

In some embodiments, there may be no Rewards Status 210, Bonus Points, Credit 208, or any of the other aforementioned hypothetical elements that could possibly be associated with the System 100 and/or the Hot List 206. Such embodiments were used to illustrate general concepts associated with the Hot List 206 which can be applied in many different ways through many different embodiments, including arbitrary combinations of those embodiments described here, or alternative embodiments that have not been described here in any capacity. One general aspect of the Hot List 206 concept illustrated by the aforementioned embodiments is that completion of Hot List 206 tasks, as a general rule, result in a customer 105 earning rewards that are exclusive in terms of type, quantity, and/or quality, such that the rewards associated with the Hot List 206 are nonequivalent to the rewards that a customer might be able to earn by making purchases at businesses 110 that are not currently on their Hot List 206. Another general rule illustrated by the aforementioned embodiments is that customers will not be able to arbitrarily remove and replace tasks on their Hot List 206 with new tasks without any penalty, payment, or waiting period of some kind. Otherwise, the incentive for customers to complete tasks on the Hot List 206 may be greatly diminished given that they may simply remove tasks at-will and ad-infinitum until they receive tasks that they already intended on completing, such as Purchase Tasks involving businesses that they already intended on visiting and making a Store Purchase at, in the first place.

Figure 3:
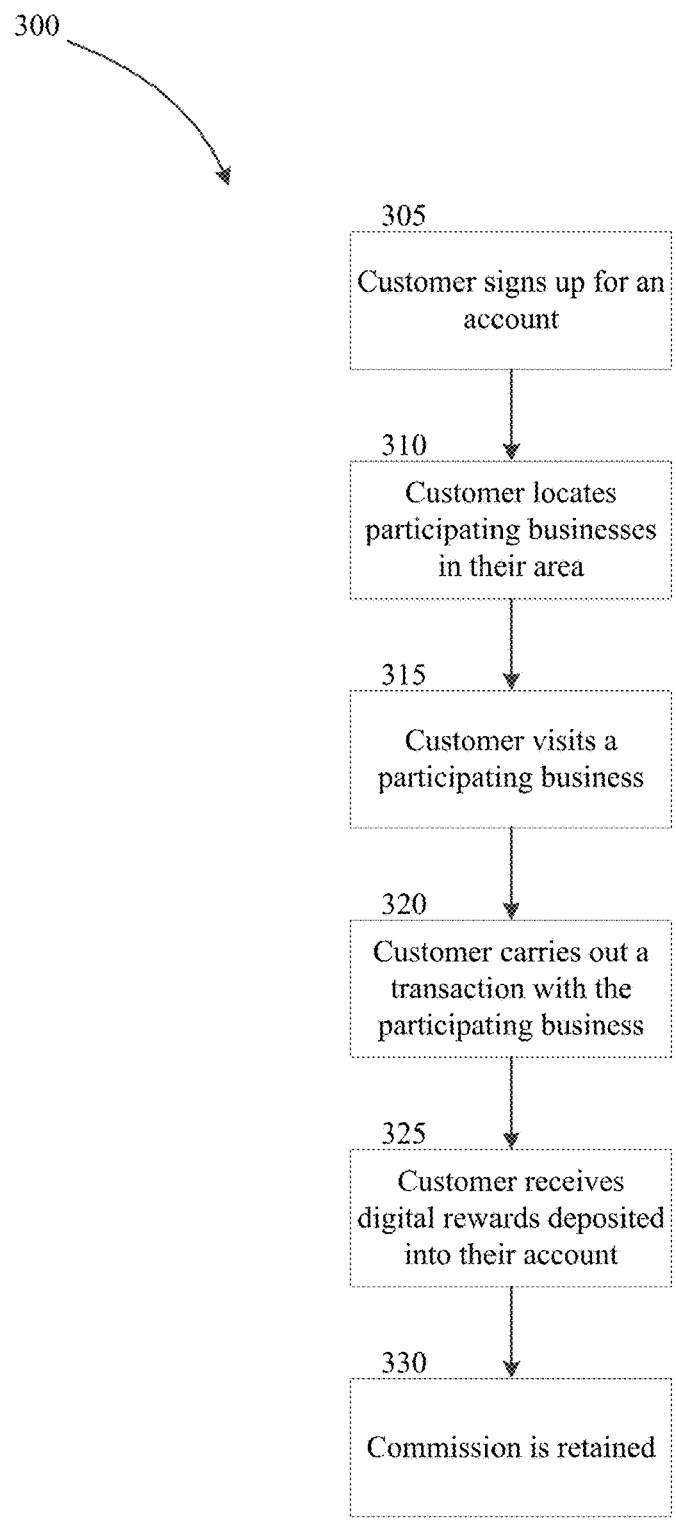
FIG. 3 illustrates an exemplary process, in accordance with an embodiment of the present invention.

FIG. 3 illustrates an exemplary process, in accordance with an embodiment of the present invention. A process 300 for a customer to use system 100 starts at a step 305 where the customer signs up for an account. In some embodiments, the customer may input identifying information and select or receive a personal identification number (PIN). In some embodiments, the customer may enter payment information such as, but not limited to, credit/debit cards, bank account, etc. into their account so that they may pay at participating businesses 110 using system 100 payment processing system. In a step 310 the customer may locate a participating business in their area. The customer may use their mobile computing device 115 to identify stores in the network by utilizing various methods such as, but not limited to, name search, store ID search, GPS location, etc. In a step 315 the customer may visit a chosen participating business. In a step 320 the customer may complete a transaction with the business. In a step 325 the customer may receive digital rewards deposited into their account. In some embodiments, the quality and/or quantity of digital rewards received by the customer may be dependent on their Rewards Status 210 or rewards rate as well as whether or not the customer chose to spend a Token 204 for the transaction. In a step 330 a commission for the transaction may be secured by an operator of system 100.

Figure 4:
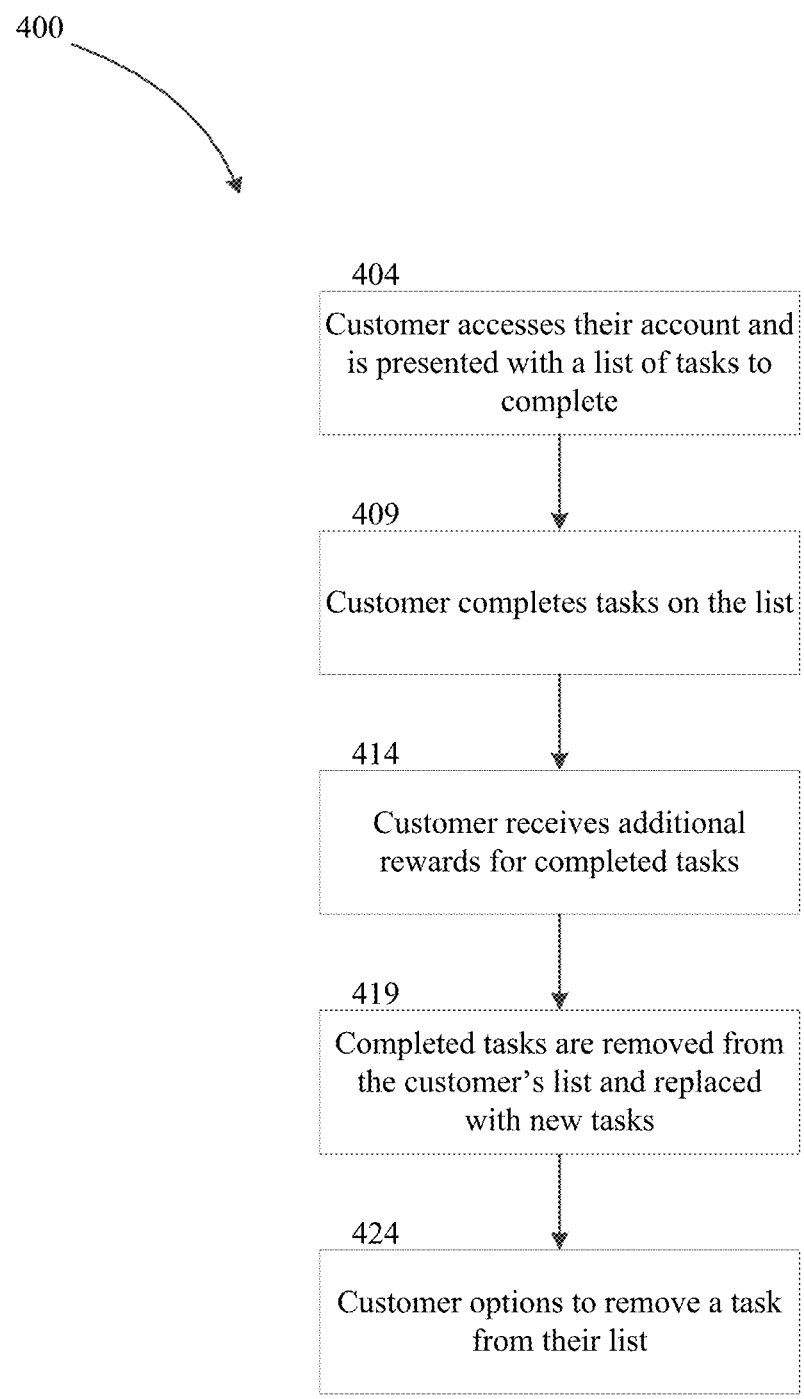
FIG. 4 illustrates an exemplary process for using a Hot List, in accordance with an embodiment of the present invention.

FIG. 4 illustrates an exemplary process for using a Hot List, in accordance with an embodiment of the present invention. A process 400 for a customer to use a Hot List in system 100 starts at a step 404 where the customer accesses their account and may be presented with their Hot List 206 which may contain a plurality of tasks to complete. The tasks may be influenced by various criteria such as, but not limited to, the customer's past activity and/or randomization. At a step 409 the customer completes a task on Hot List 206. In a non-limiting example, a task may include, but not limited to, making a purchase at a specific business, creating an account on a website, buying a specific product at a specific business, making a purchase at any business that the customer has not made a purchase at previously or recently over some time period, physically visiting the location of a business, accomplishing specific actions on social media (Twitter, Facebook, Instagram, etc.), spending at least a certain amount of money within a specified time period, etc. At a step 414 the customer receives additional rewards for completing the task. In some embodiments, the additional rewards may include, without limitation, a higher rewards rate or enhanced Rewards Status 210 for that specific transaction, progress made towards a higher rewards rate or enhanced Rewards Status 210 that may be effective throughout the entirety of the next set time period such as, without limitation, the next month, tokens 204, rewards points, free items or services such as, without limitation, those that might be offered by businesses in the Erndo network for completing a Hot List 206 task associated with their specific business, or a combination of rewards.

In some embodiments, the rewards rate or Rewards Status 210 may be incrementally increased for each task completed within a determined time period. As a non-limiting example, the customer may receive a percentage increase in their rewards rate for each task completed up to a determined maximum percentage. In some embodiments, tokens 204 may be used to achieve a higher rewards rate or enhanced Rewards Status 210 for a limited number of future transactions, the number of which is determined by the number of tokens 204 possessed by the customer. In a non-limiting example, if a customer has 1 (one) token 204 in their account, they might be able to spend that token 204 to increase their rewards rate or reward status for a single transaction, at which point the token 204 will be permanently consumed. At a step 419 completed tasks may be removed from the customer's Hot List 206. In some embodiments, a removed task may create an empty slot in the Hot List. In some embodiments, empty slots may be replaced with new tasks at an end of a determined time period. In some embodiments, all tasks and empty slots on a customer's Hot List 206 may be replaced with new tasks at regular intervals. In a non-limiting example, this might occur on the $1^{st}$ day of each month.

In some embodiments, the customer may use a token 204 or purchase Credit 208 to remove a task from Hot List 206 and/or to receive at least some of the rewards associated with the completion of that task. In some other embodiments, tokens 204 may not be used to remove a task from the Hot List 206 and/or may not be used to receive any of the rewards associated with the completion of that task. At a step 424 the customer options to remove a task from their Hot List 206. In some embodiments, the customer may purchase credit 208 for the business associated with a Purchase Task. The purchased credit 208 may then be used in the future for a transaction, but only at that specific business. In the present embodiment, the value of credit 208 may be at cash-value. In a non-limiting example, if a customer buys $10.00 of credit 208 at a business, they may later redeem that credit for $10.00 worth of goods and services at that specific business. In some embodiments, Credit 206 may be "refunded" by being converted to Points 202 if the business for which the Credit 206 is active either leaves the Erndo network or goes out of business. In some embodiments, a customer who purchases Credit 208 at a business associated with a Purchase Task on their Hot List 206 may not receive the rewards associated with completing that Purchase Task until they actually use that Credit 208 in order to make a Store Purchase at that business. In such an embodiment, if a customer has previously purchased Credit 208 at a business and the business later leaves the System 100 or goes out of business before the customer spends the Credit, the customer will no longer be capable of receiving the rewards that they would have received if they would have spent that Credit 208 at the business while it was possible to do so. In some embodiments, a customer may obtain some or even all of the rewards associated with a Hot List 206 Purchase Task simply by buying credit 208 at the business associated with the Purchase Task, without having to actually make a Store Purchase 208 in order to receive the associated Hot List 206 rewards.

Figure 5:
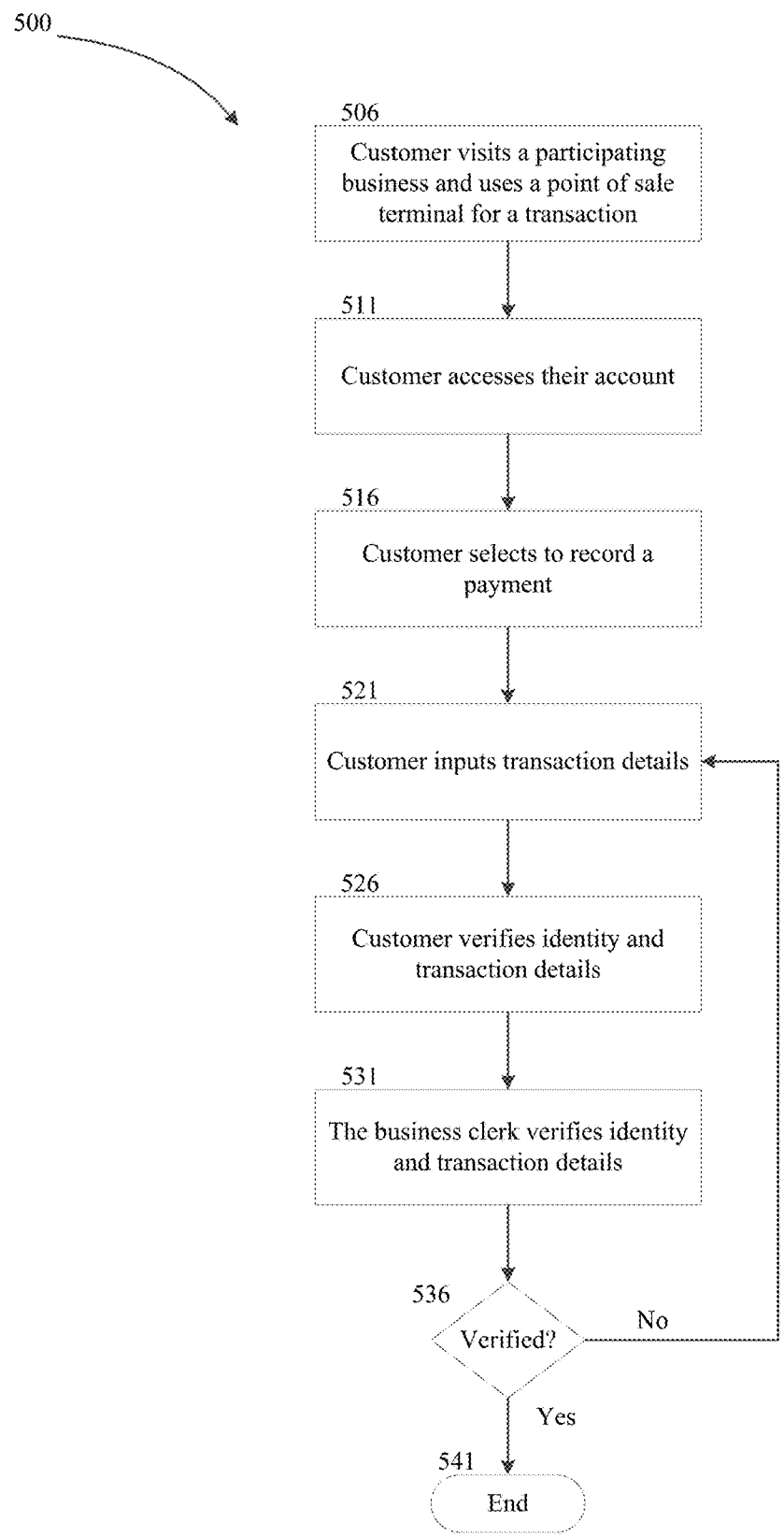
FIG. 5 illustrates an exemplary process for a transaction, in accordance with an embodiment of the present invention.

FIG. 5 illustrates an exemplary process for a transaction, in accordance with an embodiment of the present invention, that uses the business's own point-of-sale system in order to facilitate the transfer of funds. A process 500 for a customer to complete a transaction with a business in system 100 starts at a step 506 where the customer may visit a participating business and may use a point of sale terminal 125 for a transaction. In some embodiments, this exemplary process may even allow for a customer to pay for their purchase at a participating business with physical cash while still being able to use the Erndo system 100 to receive rewards for the purchase. At a step 511 the customer may access their account using their mobile computing device 115. At a step 516 the customer may select to record a payment for a transaction at the business. At a step 521 the customer may input the transaction details. At a step 526 the customer may verify their identity and transaction details. In some embodiments, the customer may be required to enter a security code such as, but not limited to, a PIN. In some embodiments, after customer verification, the customer may be instructed to hand their mobile computing device 115 to a clerk at the business. At a step 531 the business clerk may verify their identity and transaction details. In some embodiments, the clerk may be required to enter a security code such as, but not limited to, a business PIN. In an alternate embodiment, POS terminal 125 or another networked terminal may have real time access to server 120 where the clerk may approve a current transaction of the customer. At a step 536 server 120 may determine if the verification process is complete. In some embodiments, if the verification was not completed, the process may return to step 521. In some embodiments, if the verification was not completed, the process may terminate. If the verification was completed, the process ends at a step 541 where the customer's account is updated, the customer may receive points and/or other rewards, and the business may be charged for any commission associated with the transaction. In some embodiments, the quantity and or quality of rewards earned by the customer may be dependent on the customer's rewards rate or Rewards Status 210, the total value of the transaction, and/or whether or not the customer used a token 204.

Figure 6:
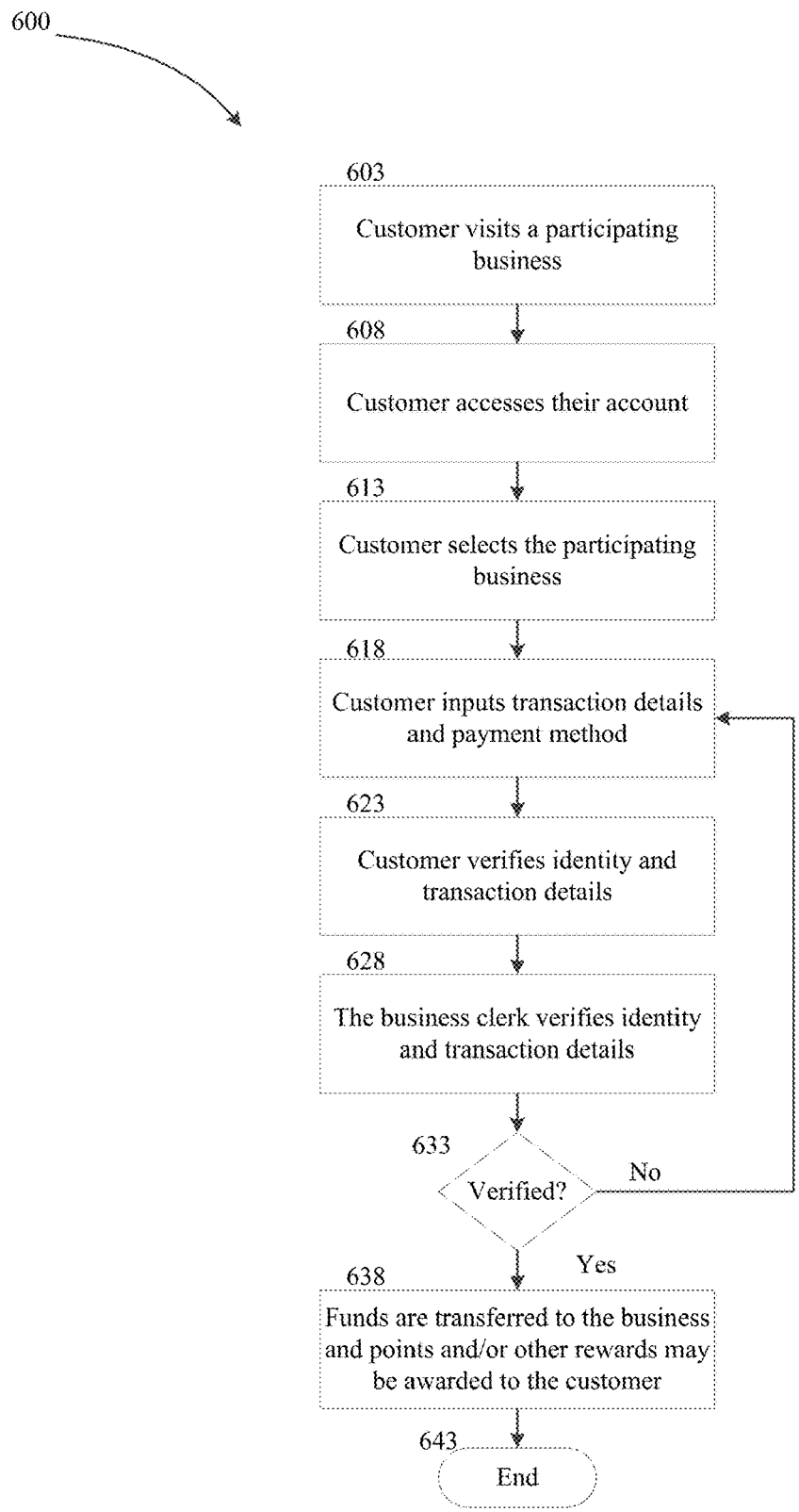
FIG. 6 illustrates an exemplary process for a transaction, in accordance with an embodiment of the present invention.

FIG. 6 illustrates an exemplary process for a transaction, in accordance with an embodiment of the present invention. A process 600 for a customer to complete a transaction with a business in system 100 starts at a step 603 where the customer may visit a participating business. At a step 608 the customer may access their account using their mobile computing device 115. At a step 613 the customer may select a payment for a transaction at the business. At a step 618 the customer may input the transaction details and payment method such as, but not limited to, credit/debit cards, bank account, etc. At a step 623 the customer may verify their identity and transaction details. In some embodiments, the customer may be required to enter a security code such as, but not limited to, a PIN. In some embodiments, after customer verification, the customer may be instructed to hand their mobile computing device 115 to a clerk at the business. At a step 628 the business clerk may verify their identity and transaction details. In some embodiments, the clerk may be required to enter a security code such as, but not limited to, a business PIN. In an alternate embodiment, POS terminal 125 or another networked terminal may have real time access to server 120 where the clerk may approve a current transaction of the customer. At a step 633 server 120 may determine if the verification process is complete. In some embodiments, if the verification was not completed, the process may return to step 618. In some embodiments, if the verification was not completed, the process may terminate. If the verification was completed, funds may be transferred to the business, the customer is charged for the transaction using the selected payment method, and points and other rewards may be awarded to the customer at a step 638. In some embodiments, the quantity and or quality of rewards earned by the customer may be dependent on the customer's rewards rate or Rewards Status 210, the total value of the transaction, and/or whether or not the customer used a token 204. In some embodiments, funds may be transferred to a third entity to be held until the involved business is scheduled to be paid for the transaction. In a non-limiting example, the business may be paid every two weeks for all applicable transactions during the previous two-week time period. In some embodiments, the quantity of points awarded to the customer may be dependent on the customer's rewards rate or Rewards Status 210, the total value of the transaction, and whether or not the customer used a token 204. In some embodiments, any commission associated with the transaction may be withheld from the funds. The process may end at a step 643.

Figure 7:
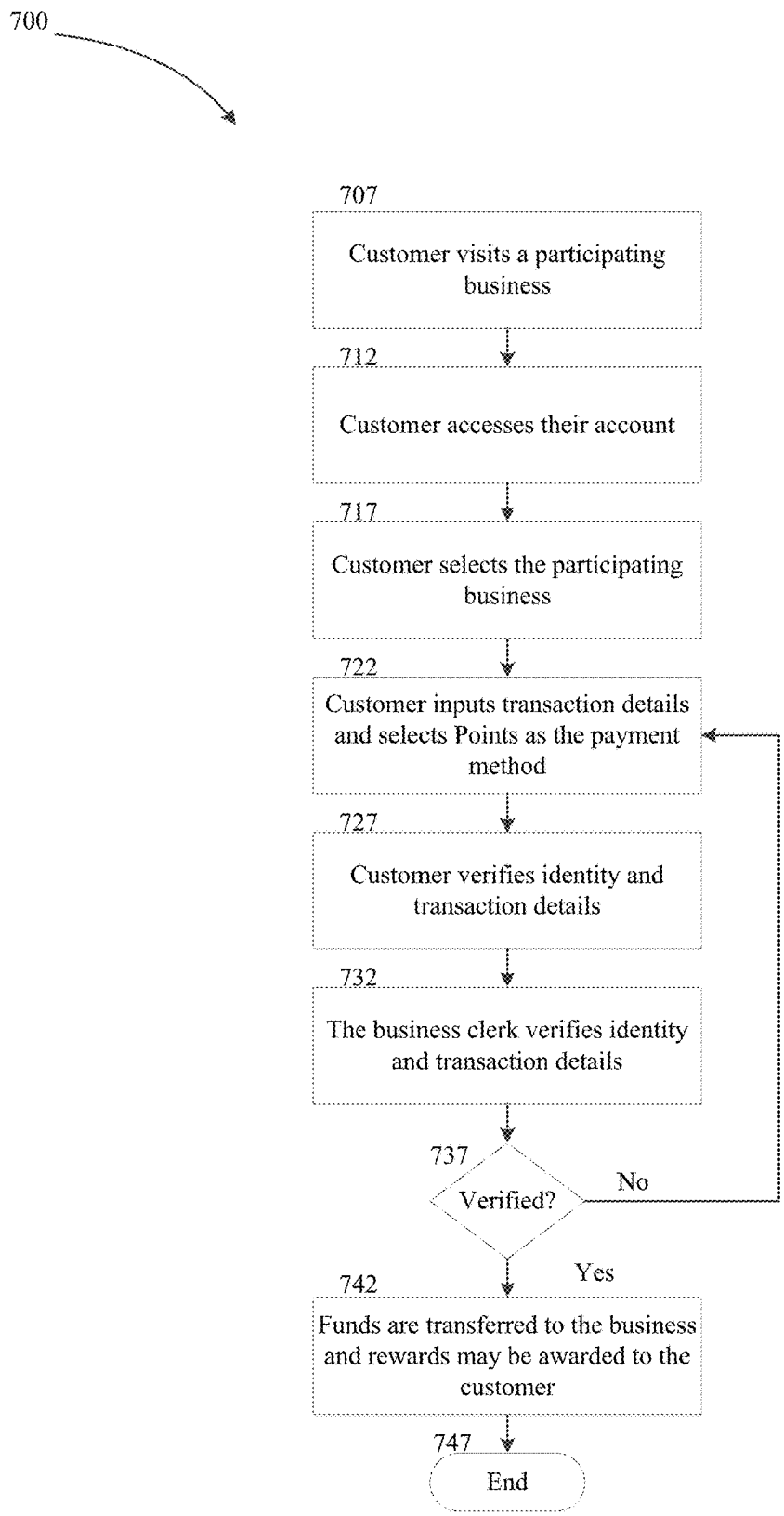
FIG. 7 illustrates an exemplary process for a transaction using points, in accordance with an embodiment of the present invention.

FIG. 7 illustrates an exemplary process for a transaction using points, in accordance with an embodiment of the present invention. A process 700 for a customer to complete a transaction with a business in system 100 starts at a step 707 where the customer may visit a participating business. At a step 712 the customer may access their account using their mobile computing device 115 and view points earned from previous transactions. At a step 717 the customer may select a payment for a transaction at the business using earned points. In some embodiments, if the transaction amount is greater than the available points, the customer may select a second payment method for the remaining balance. At a step 722 the customer may input the transaction details and any other payment method such as, but not limited to, credit/debit cards, bank account, etc. At a step 727 the customer may verify their identity and transaction details. In some embodiments, the customer may be required to enter a security code such as, but not limited to, a PIN. In some embodiments, after customer verification, the customer may be instructed to hand their mobile computing device 115 to a clerk at the business. At a step 732 the business clerk may verify their identity and transaction details. In some embodiments, the clerk may be required to enter a security code such as, but not limited to, a business PIN. In an alternate embodiment, POS terminal 125 or another networked terminal may have real time access to server 120 where the clerk may approve a current transaction of the customer. At a step 737 server 120 may determine if the verification process is complete. In some embodiments, if the verification was not completed, the process may return to step 722. In some embodiments, if the verification was not completed, the process may terminate. If the verification was completed, funds may be transferred to the business, the points used for the transaction may be deducted from the customer's account, the customer may be charged for any amount over a points value using the selected payment method, tokens may be awarded, and points may be awarded to the customer for the amount charged at a step 742. In some embodiments, the quantity and or quality of rewards earned by the customer may be dependent on the customer's rewards rate or Rewards Status 210, the total value of the transaction, and/or whether or not the customer used a token 204. In some embodiments, funds may be transferred to a third entity to be held until the involved business is scheduled to be paid for the transaction. In a non-limiting example, the business may be paid every two weeks for all applicable transactions during the previous two-week time period. In some embodiments, the quantity of points awarded to the customer may be dependent on the customer's rewards rate or Rewards Status 210, the total value of the transaction, and whether or not the customer used a token 204. In some embodiments, any commission associated with the transaction may be withheld from the funds. The process may end at a step 747.

Figure 8:
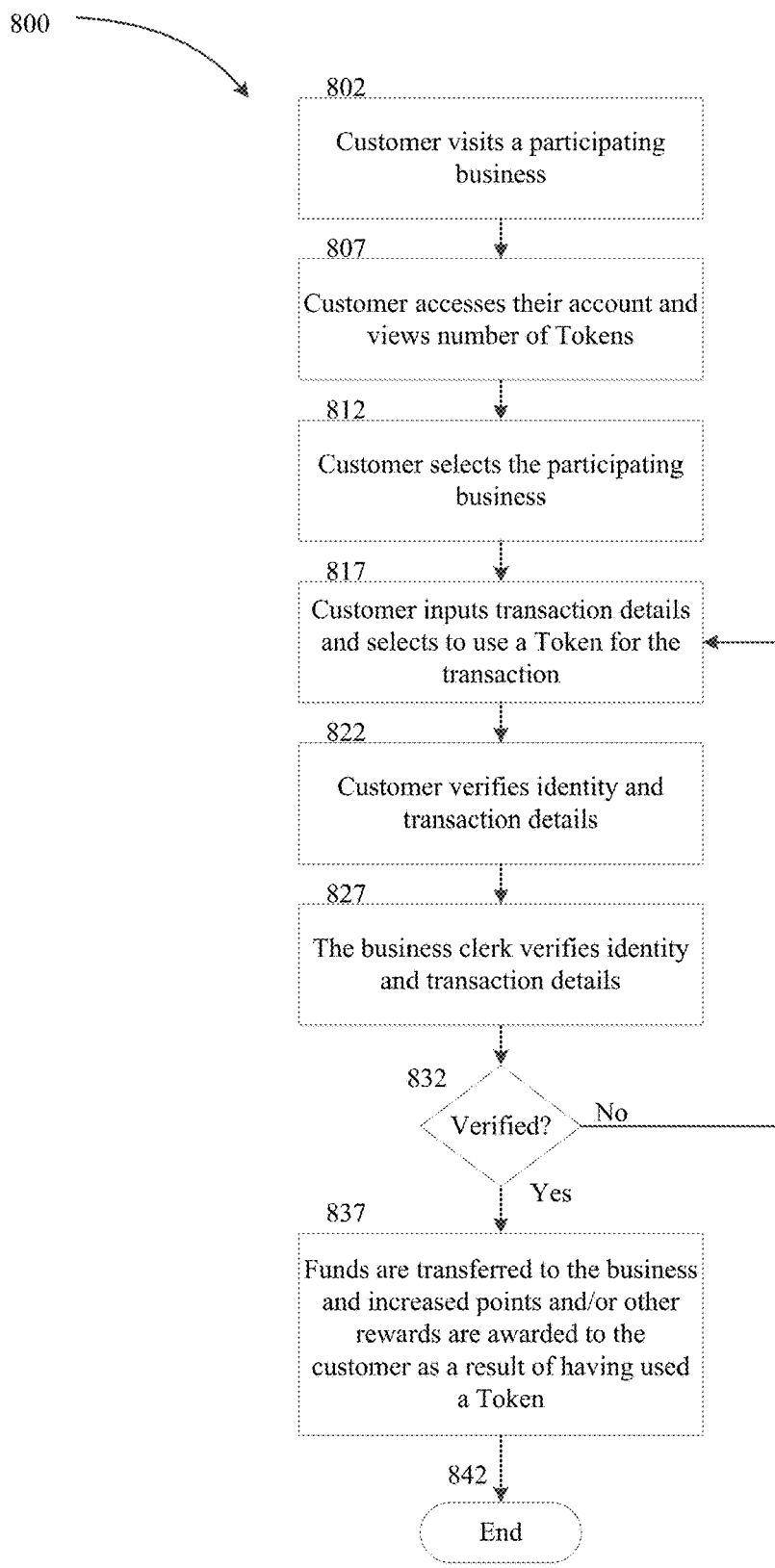
FIG. 8 illustrates an exemplary process for a transaction using tokens, in accordance with an embodiment of the present invention.

FIG. 8 illustrates an exemplary process for a transaction using tokens, in accordance with an embodiment of the present invention. A process 800 for a customer to complete a transaction with a business in system 100 starts at a step 802 where the customer may visit a participating business. At a step 807 the customer may access their account using their mobile computing device 115 and view tokens earned from previous transactions. At a step 812 the customer may select a payment for a transaction and use tokens to increase the number of points earned for the current transaction. At a step 817 the customer may input the transaction details, number of tokens to use, and payment method such as, but not limited to, credit/debit cards, bank account, etc. At a step 822 the customer may verify their identity and transaction details. In some embodiments, the customer may be required to enter a security code such as, but not limited to, a PIN. In some embodiments, after customer verification, the customer may be instructed to hand their mobile computing device 115 to a clerk at the business. At a step 827 the business clerk may verify their identity and transaction details. In some embodiments, the clerk may be required to enter a security code such as, but not limited to, a business PIN. In an alternate embodiment, POS terminal 125 or another networked terminal may have real time access to server 120 where the clerk may approve a current transaction of the customer. At a step 832 server 120 may determine if the verification process is complete. In some embodiments, if the verification was not completed, the process may return to step 817. In some embodiments, if the verification was not completed, the process may terminate. If the verification was completed, funds may be transferred to the business, the tokens used for the transaction may be deducted from the customer's account, the customer may be charged for value of the transaction using the selected payment method, and increased points and other rewards may be awarded to the customer where the quality and/or quantity of rewards earned may be determined by the transaction value and a number of tokens used at a step 837. In some embodiments, the quantity and or quality of rewards earned by the customer may be dependent on the customer's rewards rate or Rewards Status 210, the total value of the transaction, and/or whether or not the customer used a token 204. In some embodiments, funds may be transferred to a third entity to be held until the involved business is scheduled to be paid for the transaction. In a non-limiting example, the business may be paid every two weeks for all applicable transactions during the previous two-week time period. In some embodiments, the quantity of points awarded to the customer may be dependent on the customer's rewards rate or Rewards Status 210, the total value of the transaction, and whether or not the customer used a token 204. In some embodiments, any commission associated with the transaction may be withheld from the funds. The process may end at a step 842.

Figure 9:
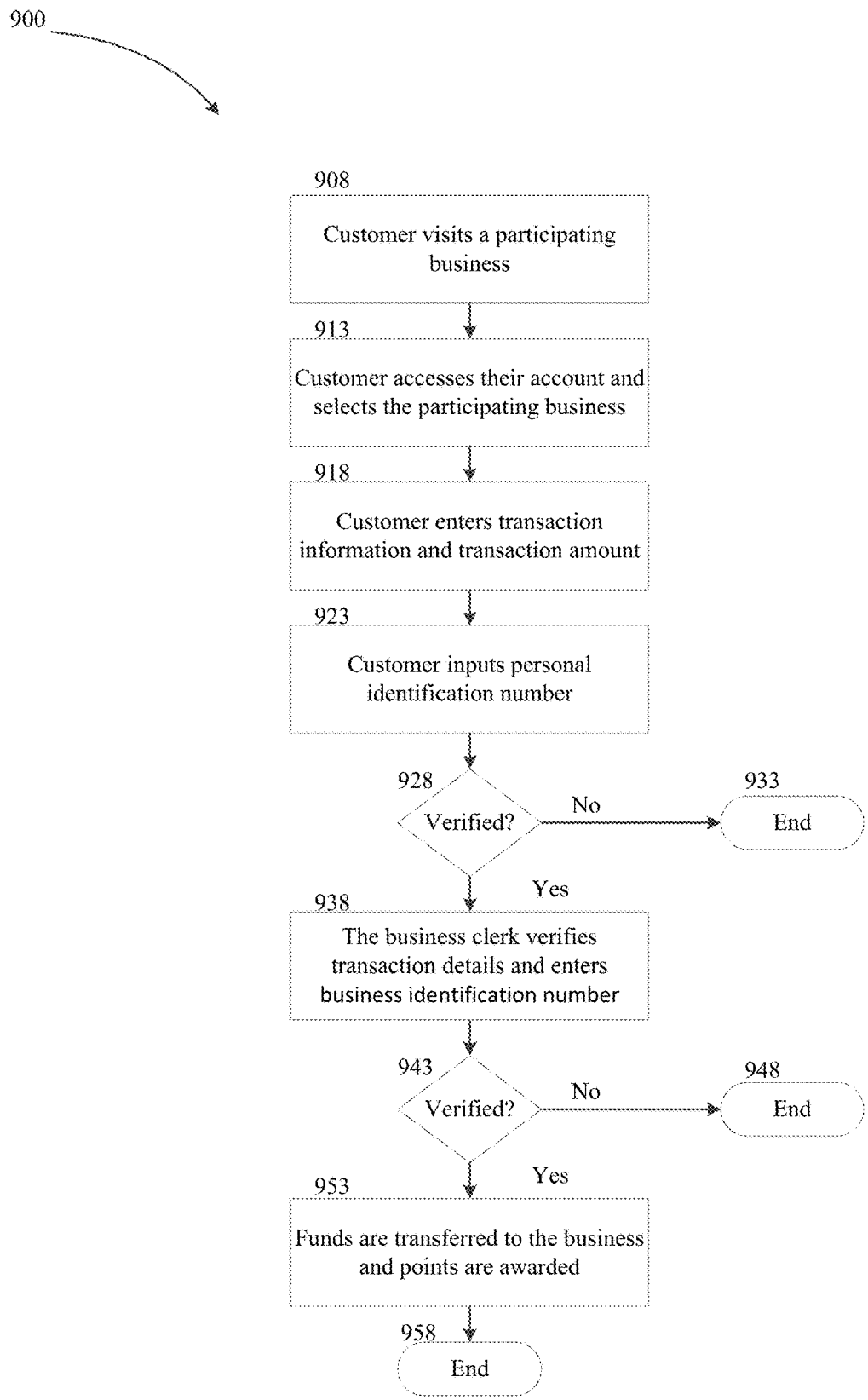
FIG. 9 illustrates an exemplary process for a transaction, in accordance with an embodiment of the present invention.

FIG. 9 illustrates an exemplary process for a transaction, in accordance with an embodiment of the present invention. A process 900 for a customer to complete a transaction with a business in system 100 starts at a step 908 where the customer may visit a participating business. At a step 913 the customer may access their account using their mobile computing device 115 and select the business. At a step 918 the customer may input the transaction details and payment method such as, but not limited to, credit/debit cards, bank account, etc. At a step 923 the customer may verify their identity and transaction details by entering a security code such as, but not limited to, a PIN. At a step 928 server 120 may determine if the security code is verified. If the security code is not verified the process end at a step 933. In some embodiments, after customer verification, the customer may be instructed to hand their mobile computing device 115 to a clerk at the business. At a step 938 the business clerk may verify their identity and transaction details by entering a security code such as, but not limited to, a business PIN. In an alternate embodiment, POS terminal 125 or another networked terminal may have real time access to server 120 where the clerk may approve a current transaction of the customer. At a step 943 server 120 may determine if the security code is verified. If the security code is not verified the process end at a step 948. If the verification was completed, funds may be transferred to the business, the customer is charged for the transaction using the selected payment method, and points may be awarded to the customer at a step 953. In some embodiments, funds may be transferred to a third entity to be held until the involved business is scheduled to be paid for the transaction. In a non-limiting example, the business may be paid every two weeks for all applicable transactions during the previous two-week time period. In some embodiments, the quantity of points awarded to the customer may be dependent on the customer's rewards rate or Rewards Status 210, the total value of the transaction, and whether or not the customer used a token 204. In some embodiments, any commission associated with the transaction may be withheld from the funds. The process may end at a step 958.

Figure 10:
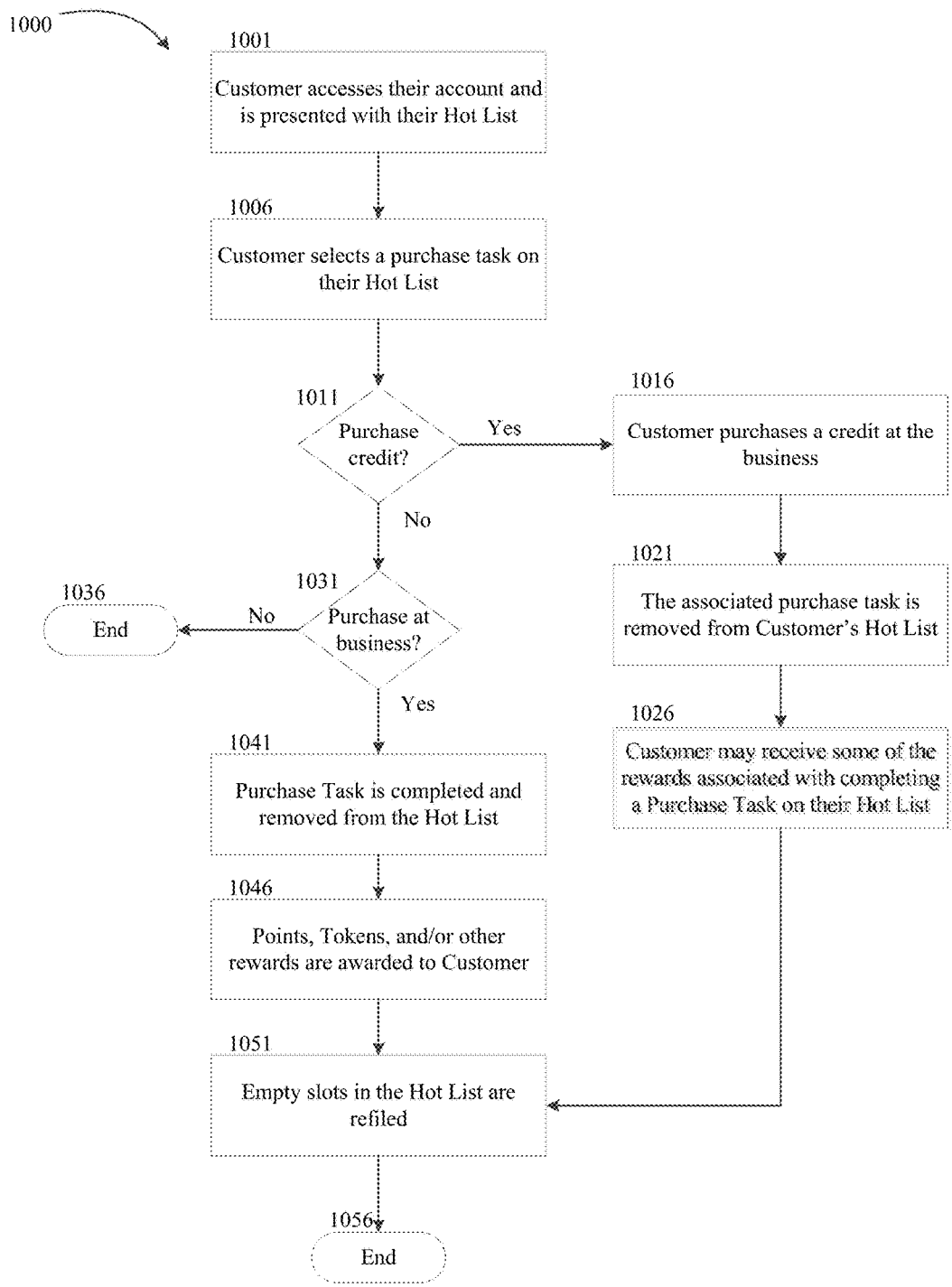
FIG. 10 illustrates an exemplary process for a transaction, in accordance with an embodiment of the present invention.

FIG. 10 illustrates an exemplary process for a transaction, in accordance with an embodiment of the present invention, involving a Purchase Task on the Hot List 206. A process 1000 for a customer to complete a Purchase Task on their Hot List 206 or purchase credit at the associated business in system 100 starts at a step 1001 where the customer may access their account using their mobile computing device 115 and view their Hot List 206. At a step 1006 the customer may select a Purchase Task on their Hot List 206. At a step 1011 the customer may have the option of purchasing minimum Credit for the associated business in order to remove the business from their Hot List 260. If the customer decides to purchase the minimum Credit, the customer may pay for the credit using a chosen method of payment and the Purchase Task may be removed from Customer' Hot List 206 leaving an empty slot at a step 1021. At a step 1026, purchasing minimum Credit may result in Customer being rewarded with at least some of the rewards associated with actually completing the Purchase Task. If Customer selects to actually complete the Purchase Task at a step 1031 by making a purchase at the associated business, then the Purchase Task may be completed and removed from the Hot List 206 at a step 1041. At a step 1046, Customer may receive special rewards exclusive to the Hot List 206 for having completed the Purchase Task by making a minimum purchase at the associated business. At a step 1051 empty slots in the customer's Hot List 260 may be refilled on a periodic basis. The process may end at a step 1056. If the customer decides not to purchase Credit or make a purchase at the business associated with the Purchase Task, then the process may end at a step 1036.

Figure 11:
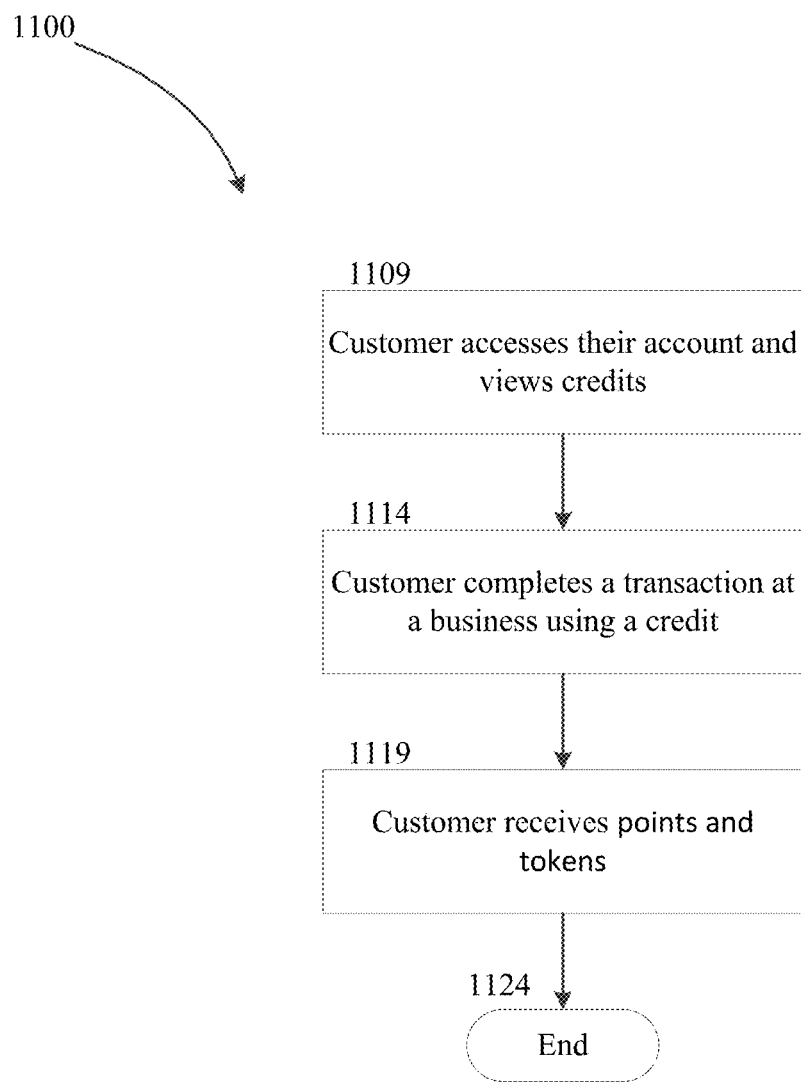
FIG. 11 illustrates an exemplary process for a transaction using Credit, in accordance with an embodiment of the present invention.

FIG. 11 illustrates an exemplary process for a transaction using Credit, in accordance with an embodiment of the present invention. A process 1100 for a customer to complete a transaction using Credit in system 100 starts at a step 1109 where the customer may access their account using their mobile computing device 115 and view their Credit 208. At a step 1114 the customer may complete a transaction at a business for which they have purchased a credit. At a step 1119 the Credit used may be removed from the customer's account and the customer may receive points, tokens, or other rewards for completing the transaction. The process may end at a step 1124.

Figure 12:
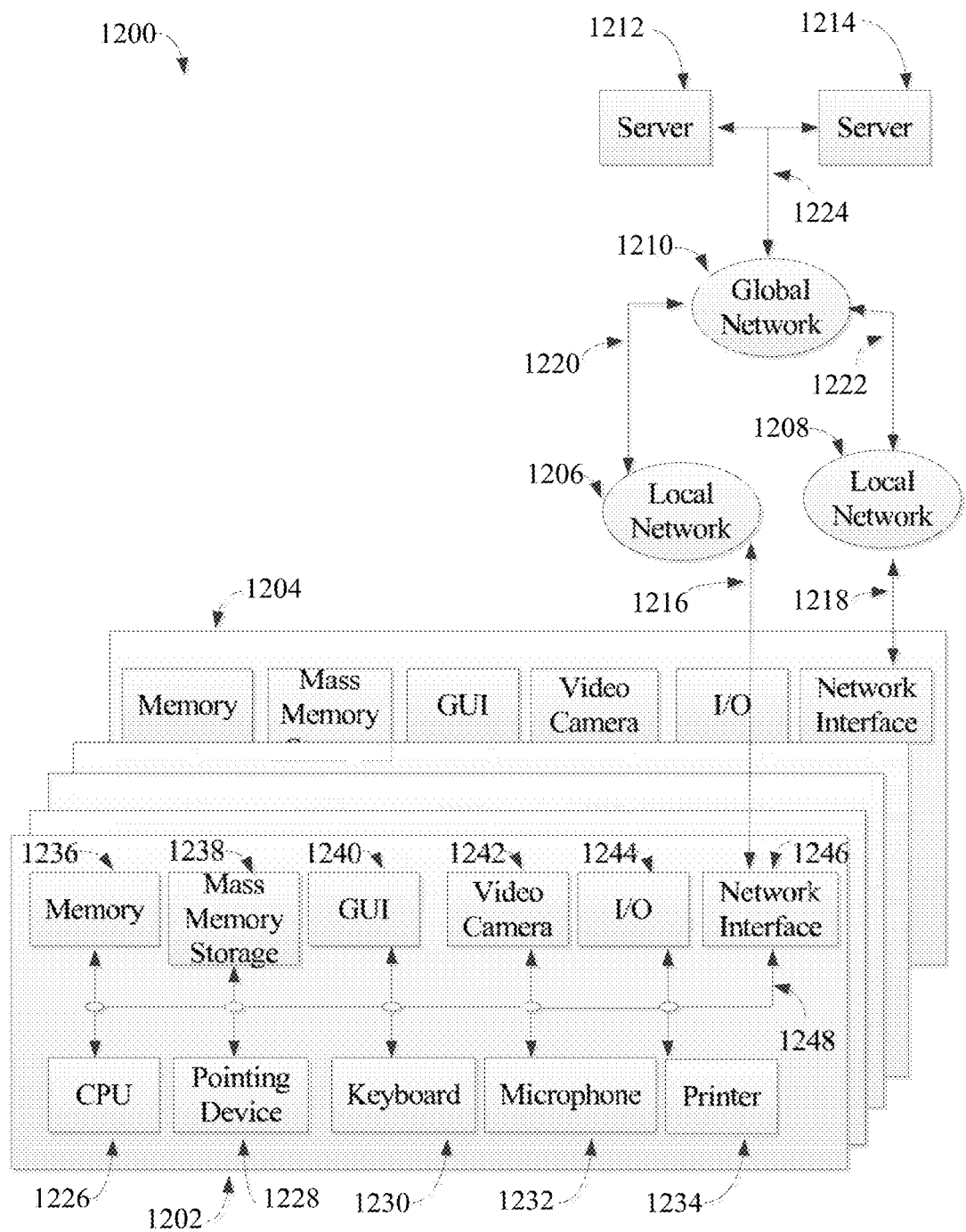
FIG. 12 is a block diagram depicting an exemplary client/server system which may be used by an exemplary web-enabled/networked embodiment of the present invention.

FIG. 12 is a block diagram depicting an exemplary client/server system which may be used by an exemplary web-enabled/networked embodiment of the present invention.

A communication system 1200 includes a multiplicity of clients with a sampling of clients denoted as a client 1202 and a client 1204, a multiplicity of local networks with a sampling of networks denoted as a local network 1206 and a local network 1208, a global network 1210 and a multiplicity of servers with a sampling of servers denoted as a server 1212 and a server 1214.

Client 1202 may communicate bi-directionally with local network 1206 via a communication channel 1216. Client 1204 may communicate bi-directionally with local network 1208 via a communication channel 1218. Local network 1206 may communicate bi-directionally with global network 1210 via a communication channel 1220. Local network 1208 may communicate bi-directionally with global network 1210 via a communication channel 1222. Global network 1210 may communicate bi-directionally with server 1212 and server 1214 via a communication channel 1224. Server 1212 and server 1214 may communicate bi-directionally with each other via communication channel 1224. Furthermore, clients 1202, 1204, local networks 1206, 1208, global network 1210 and servers 1212, 1214 may each communicate bi-directionally with each other.

In one embodiment, global network 1210 may operate as the Internet. It will be understood by those skilled in the art that communication system 1200 may take many different forms. Non-limiting examples of forms for communication system 1200 include local area networks (LANs), wide area networks (WANs), wired telephone networks, wireless networks, or any other network supporting data communication between respective entities.

Clients 1202 and 1204 may take many different forms. Non-limiting examples of clients 1202 and 1204 include personal computers, personal digital assistants (PDAs), cellular phones and smartphones.

Client 1202 includes a CPU 1226, a pointing device 1228, a keyboard 1230, a microphone 1232, a printer 1234, a memory 1236, a mass memory storage 1238, a GUI 1240, a video camera 1242, an input/output interface 1244 and a network interface 1246.

CPU 1226, pointing device 1228, keyboard 1230, microphone 1232, printer 1234, memory 1236, mass memory storage 1238, GUI 1240, video camera 1242, input/output interface 1244 and network interface 1246 may communicate in a unidirectional manner or a bi-directional manner with each other via a communication channel 1248. Communication channel 1248 may be configured as a single communication channel or a multiplicity of communication channels.

CPU 1226 may be comprised of a single processor or multiple processors. CPU 1226 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1236 is used typically to transfer data and instructions to CPU 1226 in a bi-directional manner. Memory 1236, as discussed previously, may include any suitable computer-readable media, intended for data storage, such as those described above excluding any wired or wireless transmissions unless specifically noted. Mass memory storage 1238 may also be coupled bi-directionally to CPU 1226 and provides additional data storage capacity and may include any of the computer-readable media described above. Mass memory storage 1238 may be used to store programs, data and the like and is typically a secondary storage medium such as a hard disk. It will be appreciated that the information retained within mass memory storage 1238, may, in appropriate cases, be incorporated in standard fashion as part of memory 1236 as virtual memory.

CPU 1226 may be coupled to GUI 1240. GUI 1240 enables a user to view the operation of computer operating system and software. CPU 1226 may be coupled to pointing device 1228. Non-limiting examples of pointing device 1228 include computer mouse, trackball and touchpad. Pointing device 1228 enables a user with the capability to maneuver a computer cursor about the viewing area of GUI 1240 and select areas or features in the viewing area of GUI 1240. CPU 1226 may be coupled to keyboard 1230. Keyboard 1230 enables a user with the capability to input alphanumeric textual information to CPU 1226. CPU 1226 may be coupled to microphone 1232. Microphone 1232 enables audio produced by a user to be recorded, processed and communicated by CPU 1226. CPU 1226 may be connected to printer 1234. Printer 1234 enables a user with the capability to print information to a sheet of paper. CPU 1226 may be connected to video camera 1242. Video camera 1242 enables video produced or captured by user to be recorded, processed and communicated by CPU 1226.

CPU 1226 may also be coupled to input/output interface 1244 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1226 optionally may be coupled to network interface 1246 which enables communication with an external device such as a database or a computer or telecommunications or internet network using an external connection shown generally as communication channel 1216, which may be implemented as a hardwired or wireless communications link using suitable conventional technologies. With such a connection, CPU 1226 might receive information from the network, or might output information to a network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: businesses located outside the USA. It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 122(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing loyalty rewards programs according to the present invention will be apparent to those skilled in the art. Various aspects of the invention have been described above by way of illustration, and the specific embodiments disclosed are not intended to limit the invention to the particular forms disclosed. The particular implementation of the loyalty rewards programs may vary depending upon the particular context or application. By way of example, and not limitation, the loyalty rewards programs described in the foregoing were principally directed to loyalty rewards programs implementations with consistent cash value across businesses a customer may visit; however, similar techniques may instead be applied to marketplaces that interact on the Internet, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
   accessing, with a mobile device running a mobile app, a customer account on a server system, wherein said server system is configured to monitor and record the customer earning a reward by completing a task associated with a participating business or business establishment within a group of networked or associated businesses or business establishments;

receiving, with said mobile device, a Hot List, in which said Hot List comprises a revolving list of tasks associated with the customer account, the revolving list of tasks at least comprising a plurality of businesses or business establishments and at least one action to be completed for each business, the plurality of businesses being selected by said server system from said group of associated businesses or business establishments using a selection algorithm;

communicating a completion of a one of the tasks in said Hot List, wherein said at least one of the tasks comprises a task associated with a first business establishment within said group of associated businesses;

assigning a first reward to said customer account as a result of completing said task in said Hot List associated with said first business establishment, in which said first reward is configured to be spendable in lieu of cash at any business establishment within said group of associated businesses;

communicating a completion of at least a second task, wherein said at least second task is performed in association with a second business establishment;

assigning a second reward to said customer account as a result of completing said task associated with said second business establishment, in which said second reward is configured to be spendable in lieu of cash at any business establishment within said group of associated businesses; and accepting said first or second reward at a third business establishment that could be any business establishment within said group of associated businesses as a form of payment in lieu of cash for a purchase.

2. The method as recited in claim 1, further comprising the step of communicating to said server system, with said mobile device running said mobile app, a purchase at one of the associated businesses not listed in said Hot List, wherein said server system assigns points to said customer account.

3. The method as recited in claim 1, further comprising the step of communicating to said server system, with said mobile device running said mobile app, a purchase of a credit for a one of the tasks at one of the associated businesses or through said mobile app, to said server system, wherein said server system assigns at least a portion of a reward to the customer account.

4. The method as recited in claim 1, further comprising the step of communicating a purchase using points at a fourth business establishment within said group of associated businesses or through said mobile app to said server system, wherein said server system removes points from the customer account.

5. The method as recited in claim 1, further comprising the step of communicating to said server system a purchase using a reward at a business within said group of associated businesses or through said mobile app, wherein said server system removes the reward from the customer account and assigns points and additional points to the customer account.

6. The method as recited in claim 1, further comprising the step of communicating to said server system a use of a reward for modifying a one of the tasks, wherein said server system modifies said task itself or modifies the rewards associated with the completion of said task.

7. The method as recited in claim 1, in which the reward further comprises at least one of, a token, a digital currency, points, and additional points, wherein use of the token with a purchase at one of the associated businesses assigns points, digital currency, or both points and digital currency to said customer account.

8. The method as recited in claim 1, in which the points, tokens, or digital currency have consistent cash-value, at any of said associated businesses.

9. A non-transitory computer-readable storage medium with an executable program stored thereon instructing a processor to perform the following method comprising:

steps for accessing, with a mobile device running a mobile app, a customer account on a server system, wherein said server system is configured to monitor and record the customer earning a reward by at least one of, completing a task associated with a participating business or business establishment within a group or network of associated businesses or business establishments;

steps for receiving, with said mobile device, a Hot List, in which said Hot List comprises a revolving list of tasks associated with the customer account;

steps for communicating a completion of a one of the tasks in said Hot List, wherein said at least one of the tasks comprises a task performed in association with a first business establishment within a group of associated businesses;

steps for assigning a first reward to said customer account as a result of completing said task in said Hot List associated with said first business establishment, in which said first reward is configured to be spendable in lieu of cash any business establishment within said group of associated businesses;

steps for communicating a completion of at least a second task, wherein said at least second task is performed in association with a second business establishment;

steps for assigning a second reward to said customer account as a result of completing said task at said second business establishment, in which said second reward is configured to be spendable in lieu of cash at any business establishment within said group of associated businesses; and steps for accepting said first or second reward at a third business establishment that could be any business establishment within said group of associated businesses as a form of payment in lieu of cash for a purchase.

10. The method as recited in claim 9, further comprising steps for communicating to said server system, with said mobile device running said mobile app, a purchase at one of the associated businesses or through said mobile app.

11. The method as recited in claim 9, further comprising steps for communicating, with said mobile device running said mobile app, a purchase of a credit for a one of said tasks at one of the associated businesses or through said mobile app.

12. The method as recited in claim 9, further comprising steps for communicating to said server system, with said mobile device running said mobile app, a purchase using points, tokens, or digital currency at one of the associated businesses or through said mobile app.

13. The method as recited in claim 9, further comprising steps for communicating to said server system, with said mobile device running said mobile app, a purchase using a reward at one of the associated businesses or through said mobile app.

14. The method as recited in claim 9, further comprising steps for communicating to said server system, with said mobile device running said mobile app, a use of a reward for removing a one of said tasks.

15. A non-transitory computer-readable storage medium with an executable program stored thereon, wherein the program instructs one or more processors to perform the following steps:

accessing, with a mobile device running a mobile app, a customer account on a server system, wherein said system is configured to allow customers earn rewards by completing tasks associated with participating businesses or business establishments within a group of associated businesses or business establishments;

receiving a Hot List, in which said Hot List comprises a revolving list of tasks associated with the customer account, the revolving list of tasks at least comprising a plurality of businesses and at least one action to be completed for each business, the plurality of businesses being selected by the server system from a group of associated businesses using a selection algorithm;

communicating a completion of a one of the tasks in said Hot List, wherein said at least one of the tasks comprises a in association with at a first business establishment within said group of associated businesses;

assigning a first reward to said customer account as a result of completing said task in said Hot List associated with said first business establishment, in which said first reward is configured to be spendable in lieu of cash at any business establishment within said group of associated businesses; and accepting said reward at a second business establishment that could be any business establishment within said group of associated businesses as a form of payment in lieu of cash for a purchase.

16. The program instructing the one or more processors as recited in claim 15, further comprising the step of communicating to said server system, with said mobile device running said mobile app, a purchase at one of the associated businesses or through said mobile app, wherein said server system assigns points, tokens, or digital currency to the customer account.

17. The program instructing the one or more processors as recited in claim 15, further comprising the step of communicating to said server system, with said mobile device running said mobile app, a purchase of a credit for a one of the tasks at one of the associated businesses or through said mobile app, wherein said server system assigns at least a portion of a reward to the customer account.

18. The program instructing the one or more processors as recited in claim 15, further comprising the step of communicating to said server system, with said mobile device running said mobile app, a purchase using points, tokens, or digital currency at one of the associated businesses or through said mobile app, wherein said server system removes points, tokens, or digital currency from the customer account.

19. The program instructing the one or more processors as recited in claim 15, further comprising the step of communicating to said server system, with said mobile device running said mobile app, a purchase using a reward at one of the associated businesses or through said mobile app, wherein said server system removes the reward from the customer account and assigns points, tokens, or digital currency to the customer account.

20. The program instructing the one or more processors as recited in claim 15, further comprising communicating to said server system, with said mobile device running said mobile app, a use of a reward for modifying a one of the tasks at one of the associated businesses or through said mobile app, wherein said server system modifies said task itself or modifies the rewards associated with tha completion of said task.

* * * * *